United States Patent
Bush et al.

(10) Patent No.: US 7,048,523 B2
(45) Date of Patent: May 23, 2006

(54) PROPORTIONING PUMP INCLUDING INTEGRAL ORIFICE

(75) Inventors: Mark Bush, Rockton, IL (US); Pete McNamee, Beloit, WI (US); James J. Minard, South Beloit, IL (US)

(73) Assignee: Carrier Commercial Refrigeration, Inc., Syracuse, NY (US)

( * ) Notice: Subject to any disclaimer, the term of this patent is extended or adjusted under 35 U.S.C. 154(b) by 313 days.

(21) Appl. No.: 10/391,678

(22) Filed: Mar. 18, 2003

(65) Prior Publication Data

US 2004/0182092 A1 Sep. 23, 2004

(51) Int. Cl.
*F04B 39/10* (2006.01)

(52) U.S. Cl. .................. 417/566; 417/571; 222/529

(58) Field of Classification Search ........... 417/571, 417/441, 298, 566; 222/333, 529; 99/455, 99/452
See application file for complete search history.

(56) References Cited

U.S. PATENT DOCUMENTS

| | | | |
|---|---|---|---|
| 3,272,132 A | | 9/1966 | Stoelting et al. |
| 3,829,242 A | | 8/1974 | Duke et al. |
| 3,878,992 A | * | 4/1975 | MacManus ............ 239/553 |
| 4,018,545 A | | 4/1977 | Knedlik |
| 4,079,861 A | * | 3/1978 | Brown ................. 222/135 |
| 5,632,607 A | * | 5/1997 | Popescu et al. ........ 417/415 |
| 6,857,859 B1 | * | 2/2005 | Herbers et al. .......... 417/87 |

FOREIGN PATENT DOCUMENTS

| | | |
|---|---|---|
| EP | 0 502 360 | 9/1992 |
| GB | 350660 | 6/1931 |

* cited by examiner

*Primary Examiner*—Charles G. Freay
(74) *Attorney, Agent, or Firm*—Carlson, Gaskey & Olds

(57) ABSTRACT

Mix and air combine in a mixing chamber of a housing of a frozen product system to form a mixture. A cap received in one end of the housing includes an air inlet, a mix inlet, and two mixture outlets. An integral orifice received in the air inlet regulates the amount of air that flows into the mixing chamber. A gasket positioned adjacent the cap provides a liquid tight seal that prevents air and mix from entering the mixing chamber when the mixture is dispensed from the mixing chamber and to prevent the mixture from exiting the freezing cylinder while air and mix are drawn into the mixing chamber. The gasket includes an air valve, a mix valve, and two mixture valves. An adapter draws air into the pump through an air hole and draws mix into the pump through a mix hole. A piston slides in the mixing chamber to dispense the mixture through mixture holes. The cap includes a plurality of protrusions that engage holes in the adapter to ensure proper alignment of the cap and the adapter. The gasket also includes a protrusion that engages a cavity in the cap to ensure proper alignment of the gasket with the cap.

21 Claims, 8 Drawing Sheets

PROPORTIONING PUMP INCLUDING INTEGRAL ORIFICE

BACKGROUND OF THE INVENTION

The present invention relates generally to a proportioning pump having an integral orifice that controls the proportion of fluid in a mixture. More specifically, this invention relates to a proportioning pump employed in a frozen product system to regulate the amount of air combined with a mix to create a frozen product.

A proportioning pump controls the proportion of a fluid in a mixture. The proportioning pump commonly employs an orifice to regulate the proportion of the fluid in the mixture. For example, a first fluid and a second fluid are mixed in a mixing chamber to form a mixture. If the proportion of the first fluid is to be regulated, the first fluid flows through an orifice prior to entering the mixing chamber, and the second fluid flows unrestricted into the mixing chamber. The orifice controls the proportion of the first fluid in the mixture. If the orifice is larger, the proportion of the first fluid in the mixture increases. If the orifice is smaller, the proportion of the first fluid in the mixture decreases.

Frozen product systems commonly employ proportioning pumps in the preparation of frozen products, such as frozen beverages and frozen desserts, including milkshakes and soft serve ice cream. The frozen product is made of mix and air. The mix is stored in a hopper or other containing vessel. In the prior art, when the frozen product is to be prepared, a pump draws mix from the hopper into a mixing chamber. The pump also draws air from the atmosphere into the mixing chamber. The air is regulated by an orifice, the size of the orifice determining the amount of air that is combined with the mix in the mixing chamber. The air and mix combine in the mixing chamber to form a mixture. The mixture is pumped into a freezing cylinder where the mixture is refrigerated and scrapped to form the frozen product. When the frozen product is to be served, the frozen product is dispensed from the freezing cylinder. If the frozen product is a milkshake, the milkshake is pumped into a syrup chamber and mixed with a flavored syrup and is then dispensed for serving.

In one prior art system, the same mix is employed to create both soft serve ice cream and milkshakes. More air is added to the mix to form soft serve ice cream than is added to the mix to form a milkshake. Therefore, a different size orifice is used to create soft serve ice cream and milkshakes. The orifice used with a soft serve ice cream pump is larger than the orifice used with a milkshake pump to incorporate more air into the mix to form the mixture. A drawback to the prior art pumps is that during assembly, the components of a pump used to create soft serve ice cream can be confused with the components of a pump used to create milkshakes. For example, if the orifice of a milkshake pump is accidentally assembled in the soft serve ice cream pump, not enough air is combined with the mix.

The orifice that controls the air from the atmosphere into the mixing chamber is external. Therefore, the orifice is exposed to air and can dry out over time. If the orifice dries out, the air passage can be blocked, reducing the amount of air flowing through the orifice, affecting the consistency of the resulting frozen product and the frozen product overrun. Overrun is a measurement of the amount of air in the frozen product. If the orifice is exposed to air and exposed to user interface, the amount of overrun is not predicable. As overrun decreases, the amount of profit on the frozen product can decrease, as there is less air and more mix in the frozen product per unit volume, which can decrease profit because more mix is used. To prevent this, the orifice is usually removed and cleaned daily to prevent blockage of the air passage.

A gasket controls the flow of fluids into and out of the mixing chamber. In the prior art, the gasket is complex and includes several components, increasing the complexity of assembly of the pump.

There are several drawbacks to the proportioning pump of the prior art. For one, the pump includes numerous components, making assembly of the pump complex. Additionally, the pump does not include any fail-safe mechanism to ensure the pump is assembled properly and that the components of different pumps are not confused. Finally, the external orifice must be removed daily and cleaned, requiring additional labor.

SUMMARY OF THE INVENTION

A pump in a frozen product system combines air and mix to form a mixture that is used to create a frozen product. The pump includes a piston slidably disposed in a housing that defines a mixing chamber. As the piston slides in the housing, the volume of the mixing chamber changes.

A cap received in one end the housing includes an air inlet that allows air to enter the mixing chamber, a mix inlet that allows mix to enter the mixing chamber, and two mixture outlets that allow the mixture to dispense from the mixing chamber. An integral orifice is received in the air inlet to regulate the flow of air into the mixing chamber. By adjusting the size of the orifice, the proportion of air in the mixture can be regulated.

A gasket positioned adjacent to the cap includes an air valve, a mix valve, and two mixture valves. When the gasket is aligned with the cap, the air valve aligns with the air inlet of the cap, the mix valve aligns with the mix inlet of the cap, and each of the mixture valves align with one of the mixture outlets of the cap. Each of the valves includes at least one slit which allows the passage of fluid through the valve. The gasket provides a liquid tight seal that prevents air and mix from entering the mixing chamber when mixture is dispensed from the mixing chamber and prevents the mixture from entering mixing chamber from the freezing cylinder while air and mix are drawn into the mixing chamber.

An adapter draws air and mix into the mixing chamber. Air from the atmosphere enters the adapter through an air tube and exits the adapter through an air hole. Mix from the hopper enters the adapter through a mix tube and exits the adapter through a mix hole. After combining in the mixing chamber, the mixture is dispensed from the adapter through two mixture holes, through a feed tube, and into the freezer cylinder for cooling and preparation of the frozen product.

A check ring positioned over holes in the feed tube regulates the pressure in the freezing cylinder. If the pressure in the freezing cylinder increases above a maximum threshold, the pressure in the freezing cylinder is relieved through the holes in the feed tube. The pressure forces the check ring away from the feed tube, allowing the pressure to escape.

The cap includes a plurality of protrusions that each engage a respective hole in the adapter to ensure proper alignment of the cap and the adapter. The gasket also includes a protrusion that engages a cavity in the cap to ensure proper alignment of the gasket with the cap.

During an intake stroke, the piston moves to enlarge the mixing chamber, drawing air and mix into the mixing chamber. Air and mix flow through the air valve and mix valve, respectively, of the gasket and enter the mixing chamber. The movement of the piston creates a suction that seals the mixture valves on the mixture outlets of the cap, preventing mixture in the freezing cylinder from leaking into the mixing chamber. During a compression stroke, the mixture in the freezing cylinder is dispensed through the mixture valves of the gasket. The movement of the piston creates a pressure that seals the air valve and the mix valve on the air hole and mix hole, respectively, of the adapter, preventing air and mix in the air tube and the mix tube, respectively, from leaking into the mixing chamber and preventing mixture from exiting the mixing chamber through the air hole and mix hole of the adapter.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
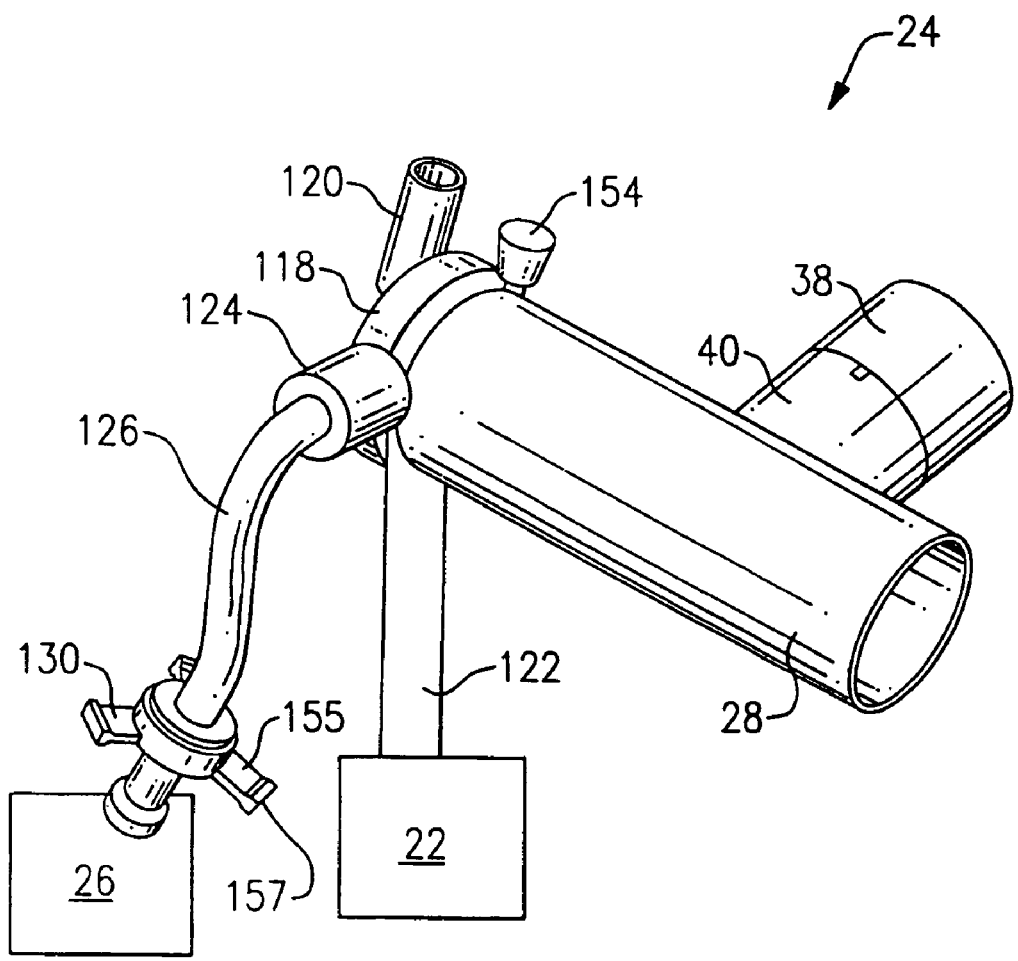
FIG. 1 schematically illustrates the pump of the present invention employed in a frozen product system.

FIG. 1 schematically illustrates the proportioning pump 24 of the present invention employed in a frozen dessert system. The pump 24 prepares a frozen product for serving. The frozen product can be soft serve ice cream or a milkshake. Frozen product mix is stored in a hopper 22 or other containing vessel. The mix is drawn into the proportioning pump 24 and mixed with air to create a mixture. The mixture is dispensed from the pump 24 and cooled and prepared in a freezing cylinder 26 prior to serving. Although a frozen product system is described, it is to be understood that the pump 24 of the present invention can be employed in any system that regulates the proportion of fluids in a mixture.

Figure 2:
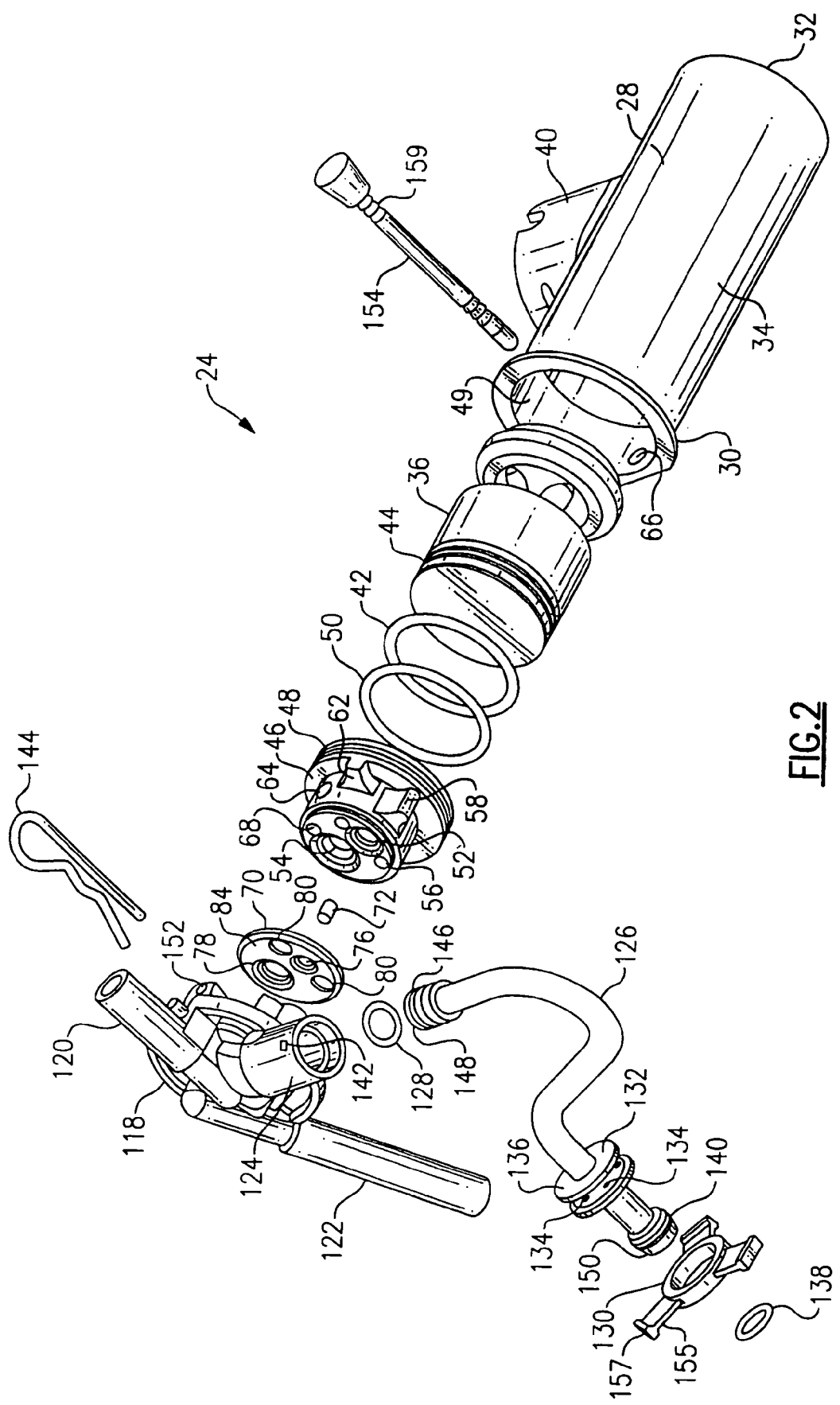
FIG. 2 schematically illustrates a perspective exploded view of the pump assembly of the present invention.
Figure 3:
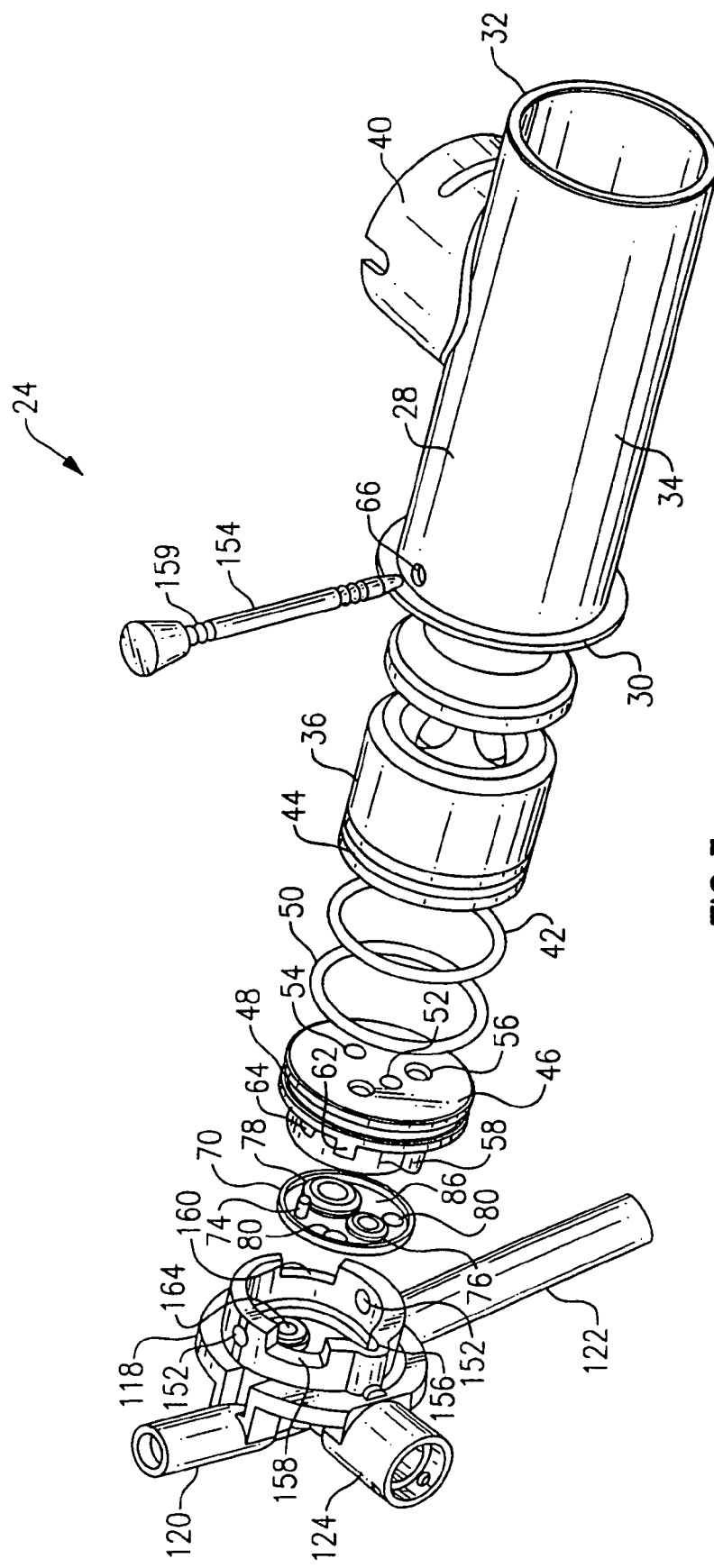
FIG. 3 schematically illustrates another perspective exploded view of the pump assembly of the present invention.

FIGS. 2 and 3 illustrate an exploded view of the components of the pump 24. The pump 24 includes a housing 28 having a first end 30, an opposing second end 32, and a mixing chamber 34. The mix and the air drawn into the housing 28 and mix in the mixing chamber 34 to form the mixture. A slidable piston 36 received in the mixing chamber 34 of the housing 28 changes the volume of the mixing chamber 34. A drive motor crank 38 (shown in FIG. 1) attached to an arm 40 of the housing 28 moves the piston 36 in the mixing chamber 34. An o-ring 42 received in an annular groove 44 of the piston 36 provides sealing between the piston 36 and the housing 28. During an intake stroke, the piston 36 moves to enlarge size of the mixing chamber 34. During a compression stroke, the piston 36 moves to reduce the size of the mixing chamber 34.

Figure 5:
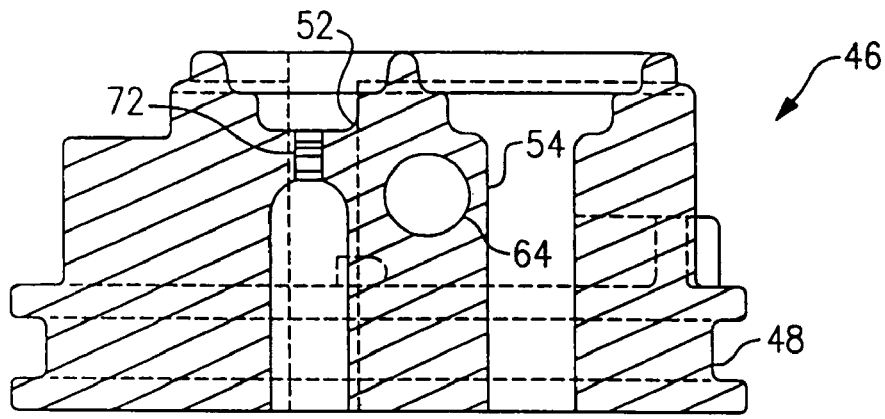
FIG. 5 schematically illustrates a cross-sectional view of the cap of FIG. 4 taken along line 5—5.
Figure 4:
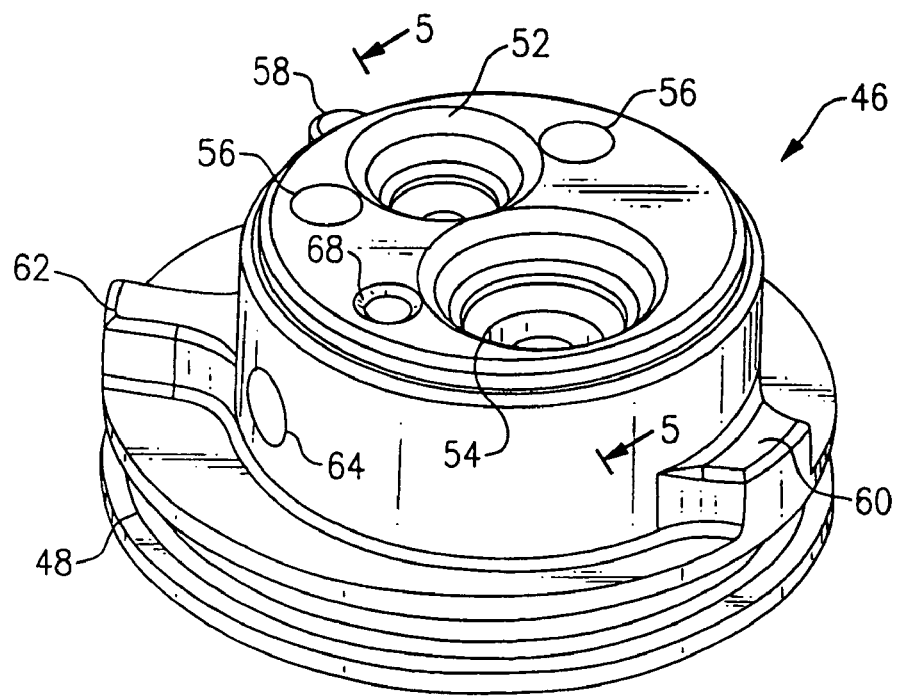
FIG. 4 illustrates a schematically illustrates a perspective view of the cap.

As further illustrated in FIGS. 4 and 5, a cap 46 is received in a counter-bore 49 in the first end 30 of the housing 28. Air and mix flow through the cap 42 and into the mixing chamber 34 of the housing 28. The cap 46 includes an annular groove 48 that receives an o-ring 50 to provide sealing between the cap 46 and the housing 28 when the cap 46 is received in the counter-bore 49.

Air from the atmosphere enters the mixing chamber 34 through an air inlet 52 in the cap 46, and mix enters the mixing chamber 34 through a mix inlet 54 in the cap 46. The mix and air combine in the mixing chamber 34 to form a mixture used to create a frozen product. The mixture exits the mixing chamber 34 through two mixture outlets 56 in the cap 46 on opposing sides of the air inlet 52.

The cap 46 further includes at least one protrusion that ensures proper alignment of the cap 46 in an adapter 118. In one example, the cap 46 includes a rounded protrusion 58, a wide protrusion 60 and a narrow protrusion 62. When the cap 46 is assembled in the pump 24, the protrusions 58, 60 and 62 gage corresponding slots in the adapter 118 to ensure proper alignment of the cap 46 with the adapter 118.

A hole 64 extends through the cap 46 between air inlet 52 and the mix inlet 54. When the cap 46 is received in the counter-bore 49 of the housing 28, the hole 64 of the cap 46 aligns with holes 66 (shown in FIGS. 2 and 3) in the housing 28. The cap 46 further includes a locator cavity 68 to ensure proper alignment of a gasket 70 with the cap 46.

An integral orifice 72 having a predetermined diameter is received in the air inlet 52 to regulate the flow of air into the mixing chamber 34 and therefore to regulate overrun. Overrun is the amount of air in the frozen product. The air to mix ratio of the mixture is controlled by using an integral orifice 72 of a predetermined diameter. By adjusting the size of the orifice 72, the proportion of air in the mixture can be regulated. If the orifice 72 is larger, more air flows through the air inlet 52, increasing the proportion of air in the mixture. If the orifice 72 is smaller, less air flows through the air inlet 52, decreasing the proportion of air in the mixture. In one example, the orifice 72 is made of stainless steel or other equivalent material.

Figure 6:
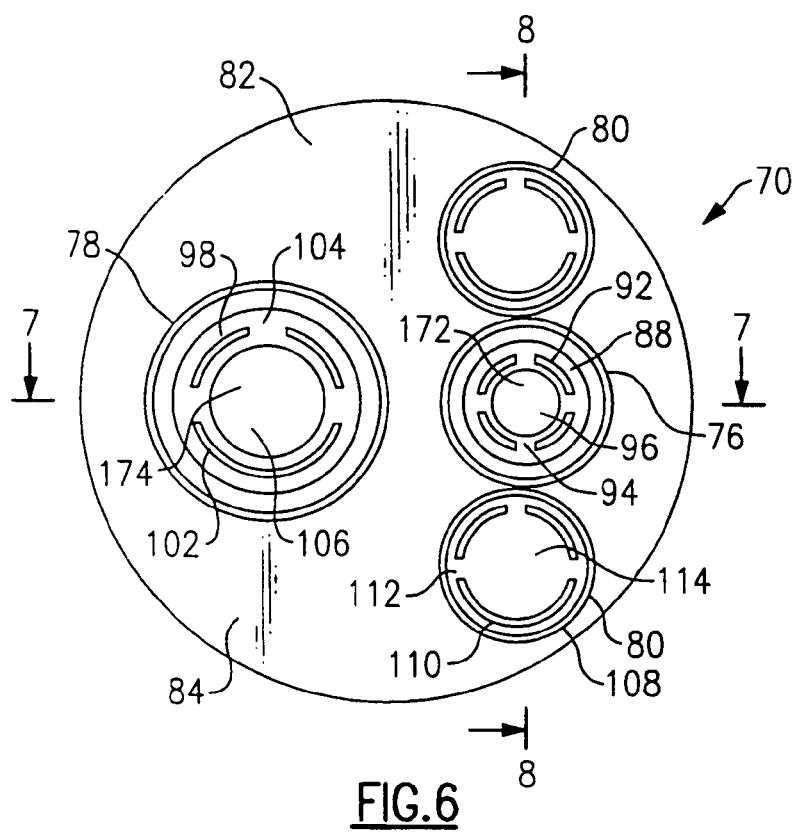
FIG. 6 schematically illustrates a front view of the gasket.

FIG. 6 schematically illustrates the gasket 70 that controls the flow of the mix, the air, and the mixture into and out of the mixing chamber 34. The gasket 70 is a unitary piece and includes an air valve 76, a mix valve 78, and two mixture valves 80. The gasket 70 also includes a protrusion 74 received in the locator cavity 68 of the cap 46 to ensure proper alignment of the gasket 70 with the cap 46. When the gasket 70 is aligned with the cap 46, the air valve 76 aligns with the air inlet 52 of the cap 46, the mix valve 78 aligns with the mix inlet 54 of the cap 46, and each of the mixture valves 80 align with one of the mixture outlets 56 of the cap 46.

The gasket 70 acts as a liquid tight seal to prevent air and mix from entering the mixing chamber 34 when mixture is dispensed from the mixing chamber 34 during the compression stroke. The gasket 70 also prevents mixture from exiting the mixing chamber 34 through the air hole 162 and the mix hole 164 of the adapter 118 (shown in FIGS. 9 and 10) during the compression stroke. The gasket 70 also prevents the mixture from exiting the freezing cylinder 26 and entering the mixing chamber 34 while air and mix are drawn into the mixing chamber 34 during the intake stroke. The gasket 70 provides a seal to prevent pressure in the freezing cylinder 26 from leaking into the mixing chamber 34. Preferably, the gasket 70 is made of an elastomer.

Figure 7:
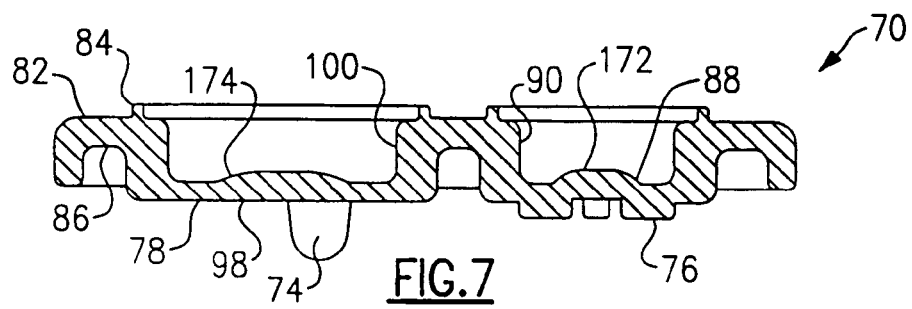
FIG. 7 schematically illustrates a cross-sectional view of the gasket taken along line 7—7 of FIG. 6.

The gasket 70 includes a body portion 82 having a first side 84 and an opposing second side 86. As further illustrated in FIG. 7, the air valve 76 includes a flat rounded portion 88 extending from the second side 86 of the body portion 82 by a cylindrical portion 90. The flat rounded portion 88 further includes a raised air surface 172 on the first side 84 of the gasket 70. The raised air surface 172 engages the adapter 118 during the compression stroke of the piston 36 to prevent air from leaking into the mixing chamber 34 and to prevent mixture from exiting the mixing chamber 34 through the air hole 162 of the adapter 118 (shown in FIGS. 9 and 10). When air is drawn into the mixing chamber 34, air flows through arc shaped slits 92 in the flat rounded portion 88. In one example, there are three arc shaped slits 92 which together form a substantially circular pattern. Ribs 94 between adjacent slits 92 retain a circular middle portion 96 to the flat rounded portion 88. As air flows through the air valve 76, the air presses on the middle portion 96 and flows through the slits 92 and into the mixing chamber 34. The ribs 94 regulate how far the middle portion 96 deflects when air is drawn into the mixing chamber 34.

The mix valve 78 includes a flat rounded portion 98 extending from the second side 86 of the body portion 82 by a cylindrical portion 100. The flat rounded portion 98 further includes a raised mix surface 174 on the first side 84 of the gasket 70. The raised mix surface 174 engages the adapter 118 during the compression stroke to prevent mix from leaking into the mixing chamber 34 and to prevent mixture from exiting the mixing chamber 34 through the mix hole 164 of the adapter 118 (shown in FIGS. 9 and 10). When mix is drawn into the mixing chamber 34, mix flows through arc shaped slits 102 in the flat rounded portion 98. In one example, there are three arc shaped slits 102 which together form a substantially circular pattern. Ribs 104 between adjacent slits 102 retain a circular middle portion 106 to the flat rounded portion 98. As mix flows through the mix valve 78, the mix presses on the middle portion 106 and flows through the slits 102 and into the mixing chamber 34. The ribs 104 regulate how far the middle portion 106 deflects when mix is drawn into the mixing chamber 34.

Figure 8:
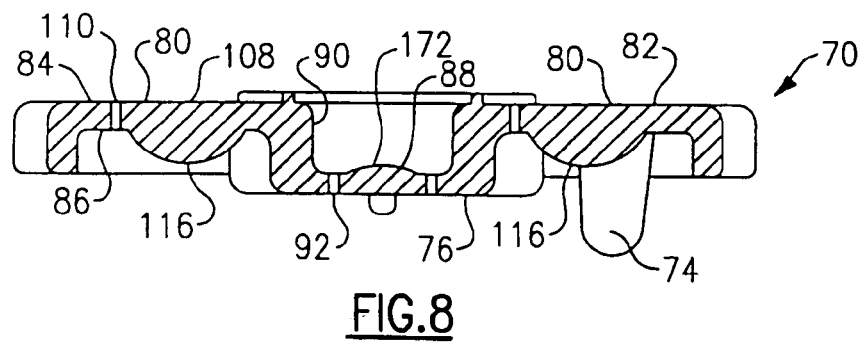
FIG. 8 schematically illustrates a cross-sectional view of the gasket taken along line 8—8 of FIG. 6.

As further illustrated in FIG. 8, the mixture valves 80 each include a flat rounded portion 108 substantially flush with the first side 84 of the gasket 70. A substantially hemispherical protrusion 116 extends from the second side 86 of the gasket 70. The hemispherical protrusions 116 each engage one of the mixture outlets 56 of the cap 46 during the intake stroke of the piston 36, preventing mixture in the freezing cylinder 26 from entering the mixing chamber 34. When mixture is dispensed from the mixing cylinder 34, the mixture flows through arc shaped slits 110 in the flat rounded portion 108. In one example, there are three arc shaped slits 110 which together form a substantially circular pattern. Ribs 112 between adjacent slits 110 retain a circular middle portion 114 to the flat rounded portion 108. As the mixture moves through the mixture valves 80, the mixture presses on the middle portions 114 and flows through the slits 110 and out of the mixing chamber 34. The ribs 112 regulate how far the middle portions 114 deflect when frozen product is drawn out of the mixing chamber 34.

The gasket 70 is a unitary piece that includes the air valve 76 that regulates the flow of air into the mixing chamber 34, the mix valve 78 that regulates the flow of mix into the mixing chamber 34, and the mixture valves 80 that regulate the flow of mixture out of the mixing chamber 34. As the gasket 70 includes the hemispherical protrusions 116 that engage the mixture outlets 56 of the cap 46 and the raised air surface 172 and the raised mix surface 174 that engage the adapter 118, the gasket 70 can provide a seal check function and a reverse seal check function. During the intake stroke, when air flows through the air valve 76 and mix flows through the mix valve 78, the hemispherical protrusions 116 of the gasket 70 seal on the mixture outlets 56 of the cap 46, preventing the mixture in the freezing cylinder 26 from leaking into the mixing chamber 34. Alternately, when the mixture flows through the mixture valves 80 of the gasket 70 from the mixing chamber 34, the raised air surface 172 of the air valve 76 and the raised mix surface 174 of the mix valve 78 provide a seal on the adapter 118, preventing air and mix from entering the mixing chamber 34 and preventing mixture from exiting the mixing chamber 34 through the air hole 162 and the mix hole 164 of the adapter 118 (shown in FIGS. 9 and 10).

Figure 9:
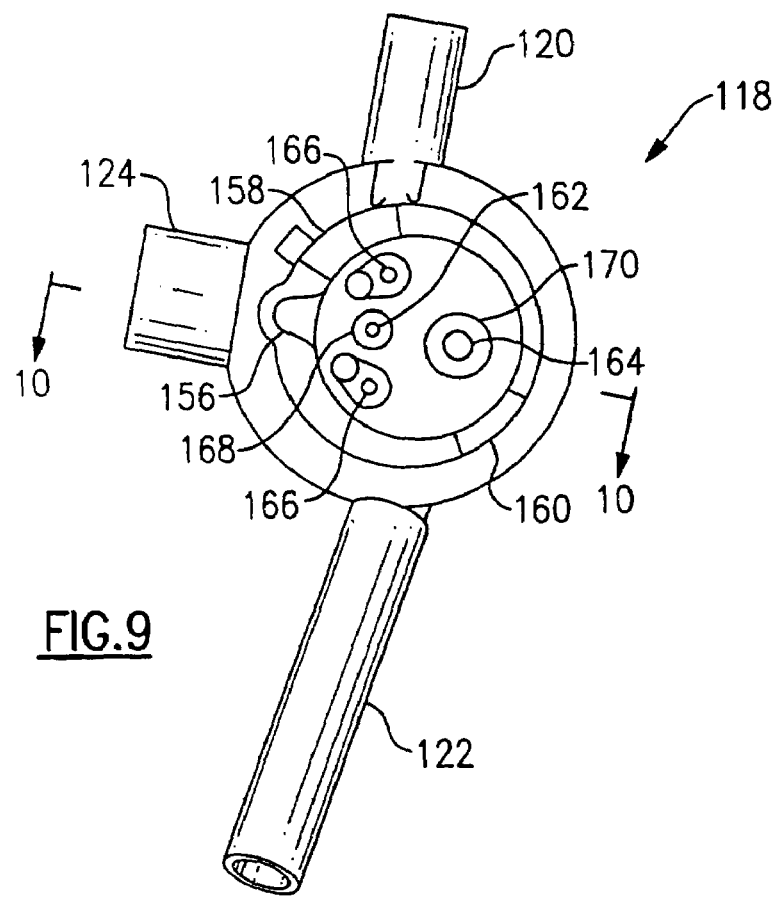
FIG. 9 schematically illustrates a front view of the adapter.
Figure 10:
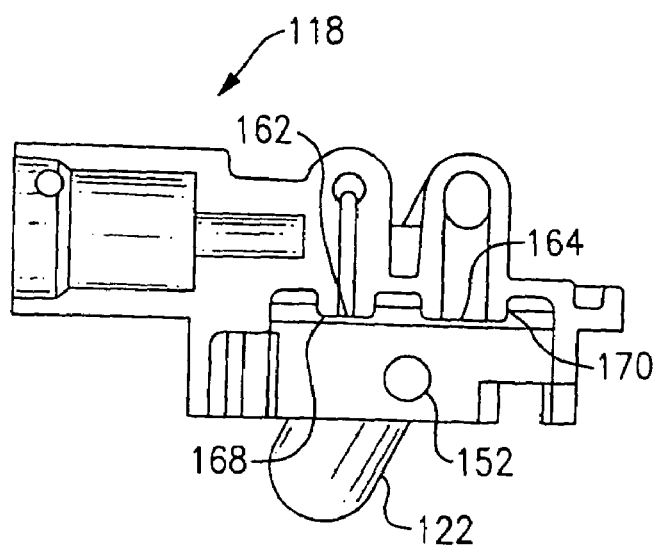
FIG. 10 schematically illustrates a cross-sectional view of the adapter taken along line 10—10 of FIG. 9.

FIGS. 9 and 10 illustrate the adapter 118. During an intake stroke of the piston 36, the adapter 118 draws air from the atmosphere and mix from the hopper 22 into the mixing chamber 34 of the housing 28 through an air hole 162 and a mix hole 164, respectively. Air enters the adapter 118 from the atmosphere through an air tube 120. Mix from the hopper 22 enters the adapter 118 through a mix tube 122. During the compression stroke, the mixture dispensed from the mixing chamber 34 exits the adapter 118 through mixture holes 166, through an exit tube 124 and then flows through a feed tube 126 and into the freezer cylinder 26.

Air drawn from the atmosphere through the air tube 120 flows through an air hole 162 of the adapter 118 that aligns with the air valve 76 of the gasket 70 and the air inlet 52 of the cap 46. Mix drawn from the hopper 22 through the mix tube 122 flows through the mix hole 164 of the adapter 118 that aligns with the mix valve 78 of the gasket 70 and the mix inlet 54 of the cap 46. As air and mix flow through the air valve 76 and the mix valve 78, respectively, the air and mix, respectively, press on the middle portions 96 and 106 of the air valve 76 and the mix valve 78, respectively, and flow through the slits 92 and 102, respectively, and into the mixing chamber 34.

Mixture from the mixing chamber 34 flow through the two mixture holes 166 that each align with one of the mixture valves 80 of the gasket 70 and one of the mixture outlets 56 of the cap 46. The mixture flows through the exit tube 124, the feed tube 126, and into the freezing cylinder 26.

As shown in FIG. 10, an elevated area 168 surrounds the air hole 162 and an elevated area 170 surrounds the mix hole 164 of the adapter 118. When the gasket 70 is positioned on the adapter 118, the raised air surface 172 of the gasket 70 is received on the elevated area 168 around the air hole 162, and the raised mix surface 174 of the gasket 70 is received on the elevated area 170 of the mix hole 164.

The adapter 118 includes a rounded slot 156, a wide slot 158, and a narrow slot 160 sized and located to receive the rounded protrusion 58, the wide protrusion 60, and the narrow protrusion 62, respectively, of the cap 46. The engagement of the protrusions 58, 60 and 62 of the cap 46 with the slots 156, 158 and 160 of the adapter 118 ensure proper alignment and assembly of the cap 46 and the adapter 118. In another example, the adapter 118 includes the slots and the cap 46 includes the holes to ensure proper alignment of the cap 46 in the adapter 118. Alternately, the adapter 118 and the cap 46 include corresponding engaging surfaces that ensure proper alignment.

An o-ring 128 positioned in a groove 146 on an enlarged first end 148 of the feed tube 126 seals between the feed tube 126 and the exit tube 124. An o-ring 138 located in a groove 140 on an enlarged second end 150 of the feed tube 126 seals between the feed tube 126 and the freezing cylinder 26. The exit tube 124 further includes two aligned holes 142. When the enlarged first end 148 of the feed tube 126 is received in the exit tube 124, a pin 144 is inserted into the aligned holes 142 to block the enlarged first end 148 of the feed tube 126 and to prevent removal of the feed tube 126 from the exit tube 124.

Returning to FIG. 2, a check ring 130 positioned on an enlarged portion 132 of the feed tube 126 regulates the pressure in the freezing cylinder 26. Preferably, the check ring 130 is made of an elastomer. The enlarged portion 132 include a plurality of holes 134. When the check ring 130 is positioned on the enlarged portion 132 of the feed tube 126, the check ring 130 covers the plurality of holes 134. A pair of flanges 136 retain the check ring 130 on the feed tube 126 and create a sealing surface of the check ring 130.

The check ring 130 further includes at least one tab 155 having an enlarged end 157. The tabs 155 provide a gripping area that aid the operator in assembling and disassembling the check ring 130 on the feed tube 126 without a tool. In one example, the check ring 130 includes three tabs 155, however, it is to be understood that any number of tabs 155 can be employed.

The check ring 130 provides pressure relief in the freezing cylinder 26. Preferably, the pressure in the freezing cylinder 26 is between 15 and 20 psi. If the pressure in the freezing cylinder 26 increases above a maximum threshold, the pressure in the freezing cylinder 26 is relieved through the holes 134 in the feed tube 126. The pressure forces the elastomer check ring 130 away from the feed tube 126, allowing the pressure to escape. When the pressure in the freezing cylinder 26 returns to a desired level, the pressure no longer forces the check ring 130 away from the feed tube 126, maintaining the pressure in the freezing cylinder 26 at the desired level.

The adapter 118 further includes two aligned holes 152 which align with the holes 64 of the cap 46 and the holes 66 of the housing 28. A pin 154 passes through the aligned holes 64, 66 and 152 to secure to adapter 118 and the cap 46 to the housing 28. The pin 154 includes a plurality of grooves 159 that assist in locking the pin 154 in the housing 28.

Figure 11:
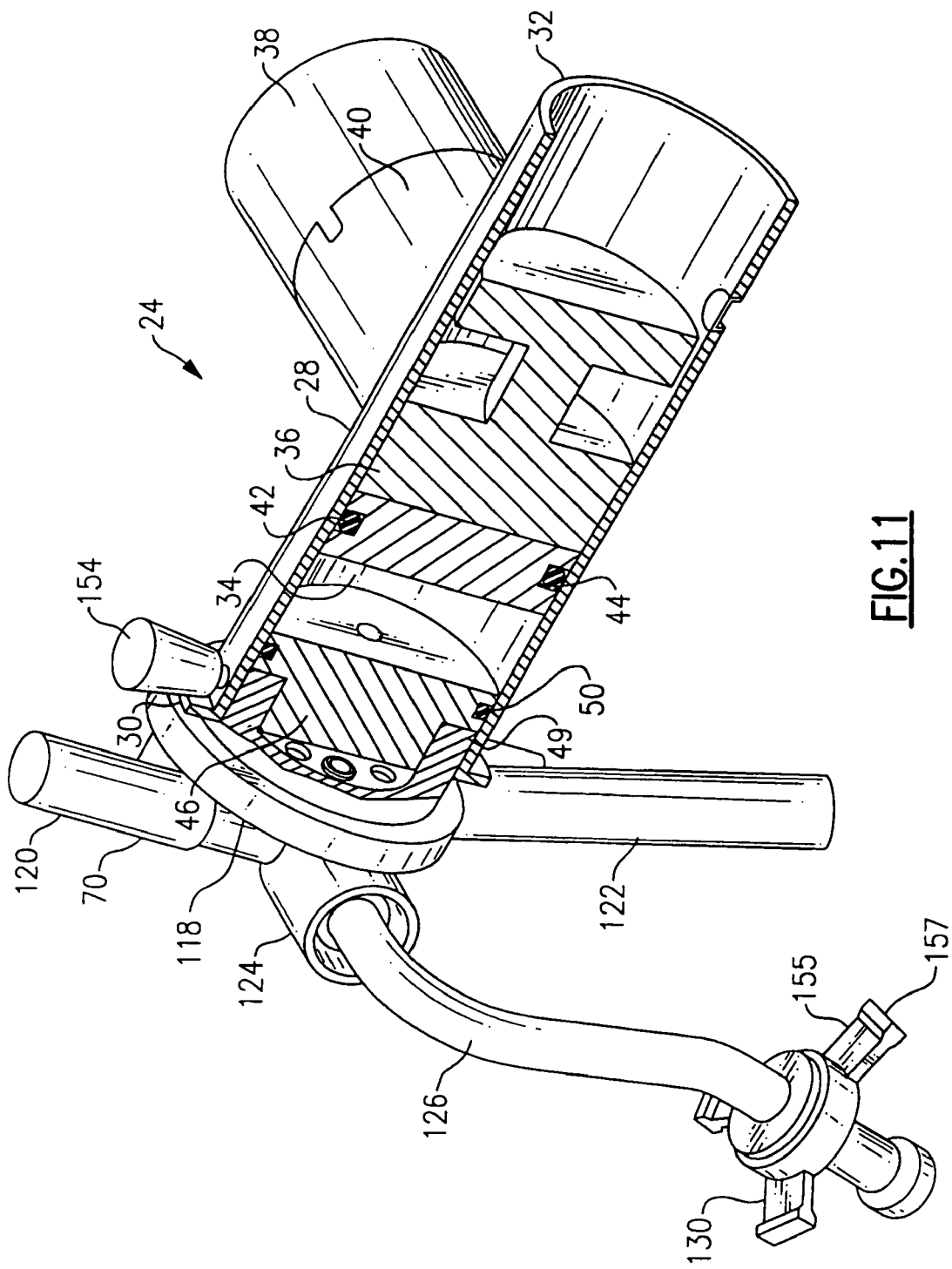
FIG. 11 schematically illustrates a cross sectional view of the pump during an intake stroke.

FIG. 11 schematically illustrates the pump 24 of the present invention during an intake stroke. The drive motor crank 38 moves the piston 36 to the second end 32 of the housing 28 to maximize the volume of the mixing chamber 34. Air is drawn from the atmosphere through the air tube 120 and flows through the air hole 162 of the adapter 118, through the air valve 76 of the gasket 70, through the air inlet 52 of the cap 46, and into the mixing chamber 34 of the housing 28. Mix is drawn from the hopper 22 through the mix tube 122 and flows through the mix hole 164 of the adapter 118, through the mix valve 78 of the gasket 70, through the mix inlet 54 of the cap 46, and into the mixing chamber 34 of the housing 28. The mix and air combine in the mixing chamber 34 to form the mixture. Movement of the piston 36 pulls the gasket 70 towards the cap 46, sealing the hemispherical protrusions 116 of the mixture valves 80 on the mixture outlets 56 of the cap 46, preventing the mixture in the freezing cylinder 26 from leaking into the mixing chamber 34. The orifice 72 is continually cleaned by the air drawn through the air inlet 52 of the cap 46, and sealed in a wet state environment during the compression stroke.

Figure 12:
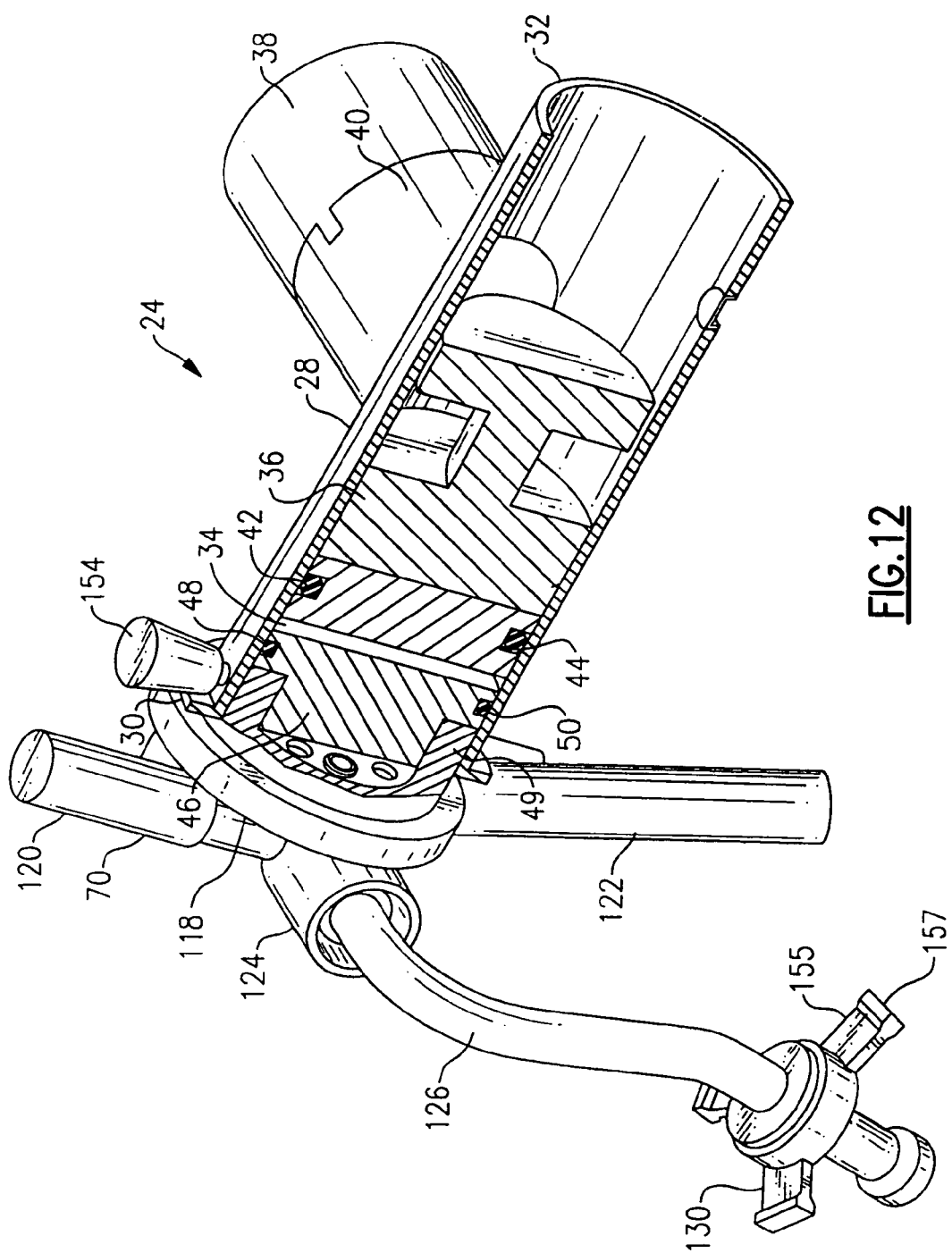
FIG. 12 schematically illustrates a cross sectional view of the pump during a compression stroke.

As shown in FIG. 12, when the piston 36 reaches the end of travel and the mixing chamber 34 has maximum volume, the compression stroke begins to dispense the mixture in the mixing chamber 34 from the pump 24. During the compression stroke, the mixture is dispensed from the mixing chamber 34 through the mixture outlets 56 of the cap 46, through the mixture valves 80 of the gasket 70, through the mixture holes 166 in the adapter 118, and through the exit tube 124 and the feed tube 126 for dispensing to the freezer cylinder 26. Movement of the piston 36 pushes the gasket 70 towards the adapter 118, and the raised air surface 172 of the air valve 76 and the raised mix surface 174 of the mix valve 86 seal on the elevated areas 168 and 170, respectively, of the air hole 162 and the mix hole 164, respectively, creating a seal. The seal prevents mix and air from leaking out of the air tube 120 and the mix tube 122, respectively, and into the mixing chamber 34 during the compression stroke. The seal also prevents mixture from leaking out of the mixing chamber 34 through the air inlet 52 and the mix inlet 54 of the cap 46 during the compression stroke. Even through the air valve 76 prevents leakage of the mixture during the compression stroke, the mixture from the mixing chamber 34 enters the cap 46 and moistens the orifice 72, preventing drying and clogging.

Although a pump used in a frozen product system has been illustrated and described, it is to be understood that the proportioning pump 24 of the present invention can be employed in any system that regulates the proportion of fluids in a mixture. Additionally, although it has been illustrated and described that the orifice 72 controls the proportion of air in the mixture, it is to be understood that an orifice can also be employed to control the proportion of mix in the mixture. Alternately, an orifice 72 can be employed to control the proportions of both air and mix into the mixing chamber.

There are several advantages to the frozen product system of the present invention. For one, the components of the pump include engaging surfaces that ensure proper assembly of the pump. The internal orifice is located in the cap and not exposed to air, eliminating drying of the orifice. The orifice is also continually cleaned on the intake stroke and moistened on the compression stroke. The gasket provides a positive seal against the mix inlet, the air inlet, and the mixture outlets, preventing leakage.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A pump comprising:
   a housing defining a mixing chamber, wherein a first fluid and a second fluid combine in said mixing chamber to form a mixed fluid;

a cap received in said housing including:
- a first inlet in fluid communication with said mixing chamber to allow said first fluid to enter said mixing chamber,
- a second inlet in fluid communication with said mixing chamber to allow said second fluid to enter said mixing chamber,
- an outlet in fluid communication with said mixing chamber to allow said mixed fluid to dispense from said mixing chamber, and
- an orifice received in said first inlet to control a flow of said first fluid through said first inlet, and a gasket having a first valve to regulate said flow of said first fluid into said mixing chamber, a second valve to regulate a flow of said second fluid into said mixing chamber and an outlet valve to regulate a flow of said mixed fluid from said mixing chamber.

2. The pump as recited in claim 1 further including an adapter including a first hole through which said first fluid is drawn into said mixing chamber, a second hole through which said second fluid is drawn into said mixing chamber, and an outlet hole through which said mixed fluid is dispensed from said mixing chamber.

3. The pump as recited in claim 2 wherein said cap includes a first surface and said adapter includes a second surface, and said first surface of said cap aligns wit said second surface of said adapter to ensure proper alignment of said cap and said adapter.

4. The pump as recited in claim 2 wherein said cap includes one of a protrusion and a hole and said adapter includes the other of said protrusion and said hole, and said protrusion engages said hole to ensure proper alignment of said cap and said adapter.

5. The pump as recited in claim 2 wherein said adapter includes a first tube that draws said first fluid into said mixing chamber, a second tube that draws said second fluid into said mixing chamber, and an exit tube through which said mixed fluid is dispensed from said mixing chamber.

6. The pump as recited in claim 1 wherein said first valve, said second valve, and said outlet valve each include a slot that allows passage of said first fluid, said second fluid, and said mixed fluid, respectively through said gasket.

7. The pump as recited in claim 1 wherein said gasket includes one of a protrusion and a cavity and said cap includes the other of said protrusion and said cavity, and said protrusion engages said cavity to ensure proper alignment of said gasket and said cap.

8. The pump as recited in claim 1 wherein said first valve prevents said first fluid from entering said mixing chamber when said mixed fluid is being dispensed from said mixing chamber, said second valve prevents said second fluid from entering said mixing chamber when said mixed fluid is being dispensed from said mixing chamber, and said outlet valve prevents said mixed fluid from dispensing from said mixing chamber when said first fluid and said second fluid are being drawn into said mixing chamber.

9. The pump as recited in claim 1 wherein said gasket is made of an elastomer.

10. The pump as recited in claim 1 wherein said orifice is made of stainless steel.

11. The pump as recited in claim 1 further including:
- an adapter to draw said first fluid and said second fluid into said mixing chamber and to dispense said mixed fluid out of said mixing chamber, and
- wherein said gasket further includes a first side and a second side, and said first side is adjacent said adapter and said second side is adjacent said cap, and said outlet valve includes a mixed fluid surface on said second side of said gasket that contacts said outlet hole of said cap, and said first valve and said second valve each include a surface on said first side of said gasket that contacts said first hole and said second hole of said adapter, respectively.

12. The pump as recited in claim 1 further including a piston slidably disposed in said mixing chamber, and said first fluid and said second fluid enter said mixing chamber when said piston slides in a first direction, and said mixed fluid is dispensed from said mixing chamber when said piston slides in an opposing second direction.

13. The pump as recited in claim 12 wherein a motor drives said piston.

14. The pump as recited in claim 1 wherein said first fluid is an air and said second fluid is a frozen product mix.

15. A pump comprising:
- a housing defining a mixing chamber, wherein a first fluid and a second fluid combine in said mixing chamber to form a mixed fluid;
- a cap received in said housing including:
  - a first inlet in fluid communication with said mixing chamber to allow said first fluid to enter said mixing chamber,
  - a second inlet in fluid communication wit said mixing chamber to allow said second fluid to enter said mixing chamber,
  - an outlet in fluid communication with said mixing chamber to allow said mixed fluid to dispense from said mixing chamber, and
  - an orifice received in said first inlet to control a flow of said first fluid through said first inlet, and
  - an outlet valve to regulate a flow of said mixed fluid from said mixing chamber;
- an adapter including a first hole through which said first fluid is drawn into said mixing chamber, a second hole through which said second fluid is drawn into said mixing chamber, an outlet hole through which said mixed fluid is dispensed from said mixing chamber, a first tube that draws said first fluid into said mixing chamber, a second tube that draws said second fluid into said mixing chamber, and an exit tube through which said mixed fluid is dispensed from said mixing chamber; and
- a freezing cylinder and a feed tube having a plurality of holes attached to said exit tube, wherein said mixed fluid flows through said feed tube and collects in said freezing cylinder for storage and preparation of said mixed fluid, and said pump further including a pressure regulator positioned over said plurality of holes, and pressure escapes said freezing cylinder through said plurality of holes when a pressure in said freezing cylinder exceeds a threshold value.

16. The pump as recited in claim 15 wherein said pressure regulator is made of an elastomer.

17. A pump comprising:
- a housing defining a mixing chamber, wherein a first fluid and a second fluid combine in said mixing chamber to form a mixed fluid;
- an adapter including a first hole through which said first fluid is drawn into said mixing chamber, a second hole through which said second fluid is drawn into said mixing chamber, and an outlet hole through which said mixed fluid is dispensed from said mixing chamber;
- a gasket including a first valve to regulate a flow of said first fluid had said mixing chamber, a second valve to regulate a flow of said second fluid into said mixing chamber, and an outlet valve to regulate a flow said mixed fluid out of said mixing chamber;

a cap received in said housing including a first inlet in fluid communication with said mixing chamber to allow said first fluid to enter said mixing chamber, a second inlet in fluid communication with said mixing chamber to allow said second fluid to enter said mixing chamber, and an outlet in fluid communication with said mixing chamber to allow said mixed fluid to dispense from said mixing chamber, wherein an orifice is received in said first inlet to control said flow of said first fluid through said first inlet; and a piston slidably disposed in said mixing chamber, and said first fluid and said second fluid enter said mixing chamber when said piston slides in a first direction, and said mixed fluid is dispensed from said mixing chamber when said piston slides in an opposing second direction.

18. The pump as recited in claim 17 wherein said cap includes one of a protrusion and a hole and said adapter includes the other of said protrusion and said hole, and said protrusion engages said hole to ensure proper alignment of said cap and said adapter.

19. The pump as recited in claim 17 wherein said gasket includes one of a protrusion and a cavity and said cap includes the other of said protrusion and said cavity, and said protrusion engages said cavity to ensure proper alignment of said gasket and said cap.

20. The pump as recited in claim 17 wherein said gasket includes a first side and a second side, and said first side is adjacent said adapter and said second side is adjacent said cap, and said outlet valve includes a mixed fluid surface on said second side of said gasket that contacts said outlet hole in said cap, and said first valve and said second valve each include a surface on said first side of said gasket that contacts said first hole and said second hole, respectively, of said adapter.

21. A method of making a mixed fluid comprising the steps of:

drawing a first fluid into a mixing chamber of a housing through an integral orifice;

proportioning an amount of said first fluid in said mixing chamber with said integral orifice;

regulating a flow of said first fluid in said mixing chamber with a first valve;

drawing a second fluid into said mixing chamber;

regulating a flow of said second fluid in said mixing chamber with a second valve;

mixing said first fluid and said second fluid in said mixing chamber to form the mixed fluid;

dispensing said mixed fluid from said mixing chamber through an outlet;

regulating a flow of said mixed fluid out of said mixing chamber With an outlet valve, wherein a gasket includes the first valve, the second valve and the outlet valve; and preventing said first fluid and said second fluid from entering said mixing chamber through said outlet during the steps of drawing the first fluid and the second fluid into the mixing chamber.

* * * * *

UNITED STATES PATENT AND TRADEMARK OFFICE
CERTIFICATE OF CORRECTION

| | |
|---|---|
| PATENT NO. | : 7,048,523 B2 |
| APPLICATION NO. | : 10/391678 |
| DATED | : May 23, 2006 |
| INVENTOR(S) | : Bush et al. |

It is certified that error appears in the above-identified patent and that said Letters Patent is hereby corrected as shown below:

Column 9, Line 26 of the issued patent, "wit" should read as --with--.

Column 10, Line 25 of the issued patent, "wit" should read as --with--.

Signed and Sealed this

Twenty-ninth Day of August, 2006

JON W. DUDAS
*Director of the United States Patent and Trademark Office*